(12) United States Patent
Henry

(10) Patent No.: US 6,832,709 B2
(45) Date of Patent: Dec. 21, 2004

(54) BALL MOUNT HOLDER

(76) Inventor: Dwayne E. Henry, 2662 Crocus Drive, Regina, Saskatchewan (CA), S4V 1T2

( * ) Notice: Subject to any disclaimer, the term of this patent is extended or adjusted under 35 U.S.C. 154(b) by 133 days.

(21) Appl. No.: 10/173,441

(22) Filed: Jun. 18, 2002

(65) Prior Publication Data

US 2003/0230608 A1 Dec. 18, 2003

(51) Int. Cl.[7] .................................................. B60R 7/00
(52) U.S. Cl. .................... 224/403; 224/521; 280/491.5; 280/504; 280/507
(58) Field of Search ................................ 224/403, 402, 224/512, 519, 520, 521; 280/480.1, 491.1, 491.3, 491.5, 504, 507

(56) References Cited

U.S. PATENT DOCUMENTS

| | | | | |
|---|---|---|---|---|
| 5,476,279 A | * | 12/1995 | Klemetsen | 280/415.1 |
| D372,892 S | * | 8/1996 | McCoy et al. | D12/162 |
| 5,702,118 A | * | 12/1997 | Hanson et al. | 280/491.5 |
| 5,884,930 A | * | 3/1999 | Cluth | 280/497 |
| 6,125,945 A | * | 10/2000 | Skaggs et al. | 172/439 |
| 6,234,512 B1 | * | 5/2001 | Bettenhausen | 280/491.1 |
| D462,037 S | * | 8/2002 | Pancheri et al. | D12/162 |
| 6,474,522 B1 | * | 11/2002 | Johnson | 224/515 |
| 2002/0017770 A1 | * | 2/2002 | Parrish | 280/480.1 |
| 2003/0057676 A1 | | 3/2003 | Griggs et al. | |

* cited by examiner

*Primary Examiner*—Stephen K. Cronin
(74) *Attorney, Agent, or Firm*—Ryan W. Dupuis; Adrian D. Battison; Michael R. Williams

(57) ABSTRACT

A holder and method of use are provided for storing a ball mount having a stem and a ball supported on the stem in a ball hitch in which the stem is slidably received within a receiver supported on a vehicle. The holder includes a pocket for slidably receiving the stem therein and mounting means for mounting the pocket on a supporting surface of the vehicle, for example a side wall of a truck box. The use of a pocket with suitable mounting means for mounting to a supporting surface of the vehicle while securing the stem of a ball mount therein provides proper storage for ball mounts which are not in use. The result is that potentially damaging or annoying sliding movement of the ball mounts within a moving vehicle can be prevented.

17 Claims, 3 Drawing Sheets

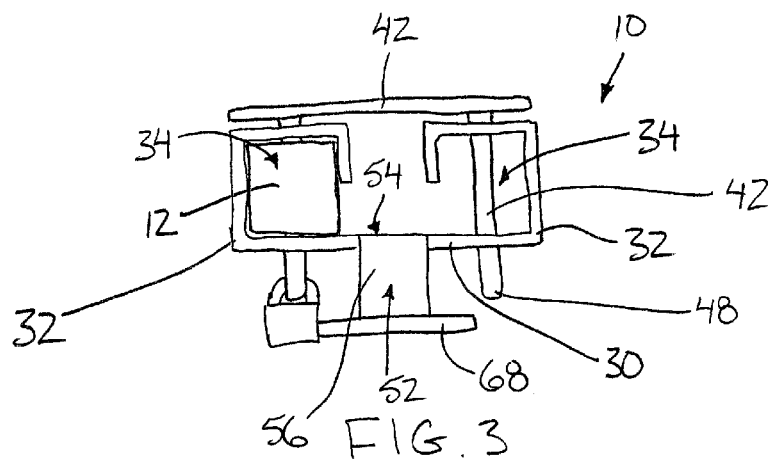
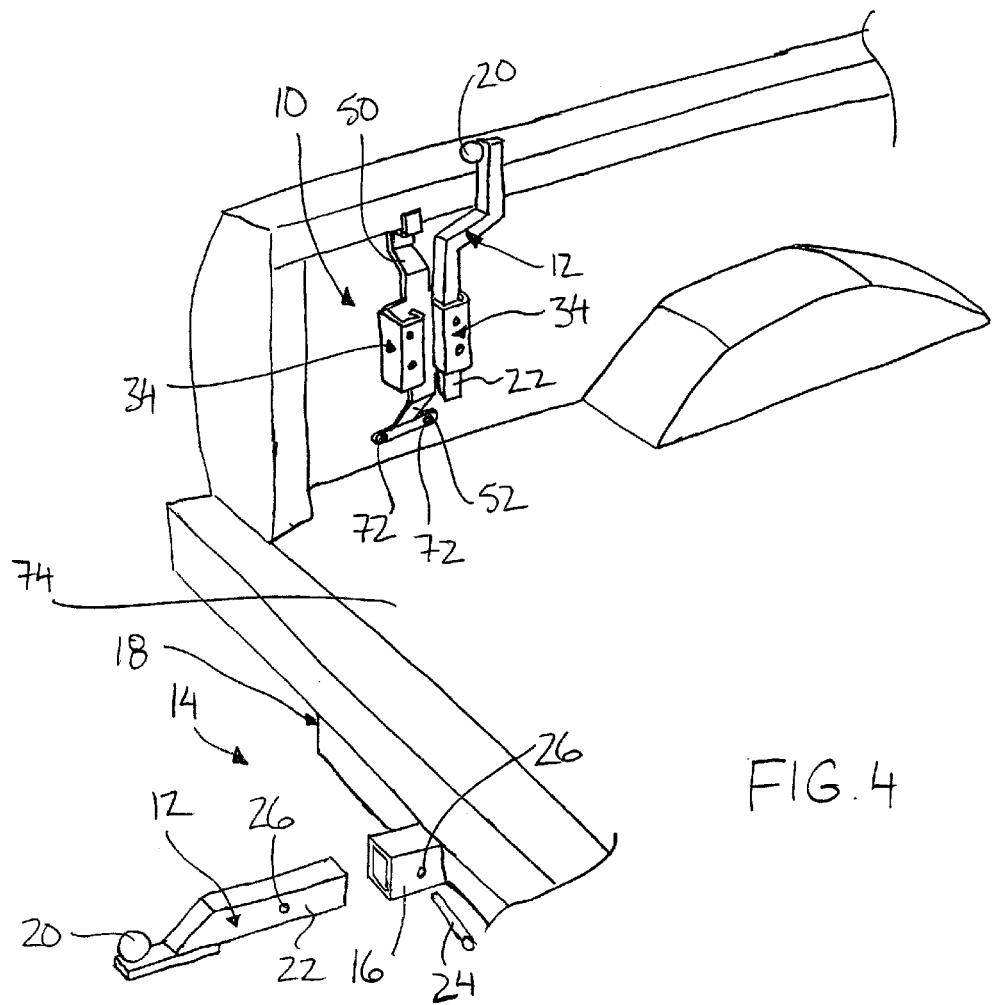

BALL MOUNT HOLDER

FIELD OF THE INVENTION

The present invention relates to a holder for supporting a ball mount of a ball hitch, in storage on a vehicle, in which the ball mount includes a stem normally slidably received within a receiver on the vehicle in use.

BACKGROUND OF THE INVENTION

The use of ball hitches are well known towing various types of trailers from common road vehicles. Common sizes of ball hitches include 1⅞ inch, 2 inches and 2 5/16 inches in outer diameter, however other sizes are also known. Typical ball hitches include a receiver which is mounted on a frame of the vehicle by bolting or welding and a ball mount which is selectively, slidably mounted within the receiver. The ball mount generally comprises a ball supported on a flat bar welded to a stem in which the stem is arranged to be slidably received within the receiver fixed on the vehicle. The stem may comprise a square tube or bar which is usually 2 inches by 2 inches in outer dimensions in cross section. A suitable locking pin is received within co-operating apertures in both the receiver and the stem of the ball mount for locking the ball mount within the receiver. In general, the different sizes of balls for ball hitches are provided mounted on their own respective stems so that the receiver only mounts one of the ball mounts therein at a given time. When the remaining ball mounts are not in use, they are typically stored in a truck box of a truck or in the trunk of a vehicle so as to cause potentially damaging and annoying sliding around of the ball mount during movement of the vehicles. Even when only one size of a ball hitch is required by a particular individual, it is typically recommended for safety to remove the ball mount from the receiver when not in use and thus proper storage of the ball mount is still required.

SUMMARY OF THE INVENTION

According to one aspect of the present invention there is provided a method of storing a ball mount having a stem and a ball supported on the stem in a ball hitch in which the stem is slidably received within a receiver supported on a vehicle, the method comprising:

providing a pocket for slidably receiving the stem; and mounting the pocket on the vehicle.

The use of a pocket with suitable mounting means for mounting to a supporting surface of the vehicle while securing the stem of a ball mount therein provides proper storage for ball mounts which are not in use. The result is that potentially damaging or annoying sliding movement of the ball mounts within a moving vehicle can be prevented.

The pocket is preferably mounted on the vehicle in an upright orientation. When the pocket is mounted in the box of a truck, the method preferably includes mounting the pocket spaced from an inner side wall of the box upon which the pocket is supported.

The pocket may be mounted to the inner side wall of the box using existing fasteners and mounting apertures in the inner side wall of the box. When a mounting bracket is provided for mounting the pocket on the vehicle having a slot therein, the pocket is preferably mounted in a box of a truck by inserting a cap flange of the truck box into the slot in the mounting bracket.

The pocket and mounting means for the pocket are preferably formed of a single sheet of material which is cut and folded.

The pocket is preferably mounted spaced outwardly from a supporting surface of the vehicle upon which the pocket is mounted.

According to a further aspect of the present invention there is provided a holder for a ball mount having a stem and a ball supported on the stem in a ball hitch in which the stem is slidably received within a receiver supported on a vehicle, the holder comprising:

a pocket for receiving the stem; and mounting means for mounting the pocket on the vehicle.

The pocket preferably includes an opening extending therethrough which has interior dimension of approximately 2 inches by 2 inches in cross section for mating with standard size ball mount stems.

The holder according to claim 1 wherein there is provided a plurality of pockets supporting at spaced positions from one another by the mounting means.

The pocket preferably includes an opening extending therethrough and tranverse locking apertures in opposed sides thereof for receiving a locking member transversely across the opening of the pocket.

The mounting means may include a plate member having mounting apertures therein for receiving respective fasteners therethrough. The mounting means may further include a slot for slidably receiving a flange therein opposite the mounting apertures. The slot and the mounting apertures are preferably spaced apart and opposite ends of the pocket.

When the pocket includes an opening extending therethrough in a longitudinal direction, the plate member is preferably generally parallel to the longitudinal direction.

The mounting means preferably include first and second mounting brackets at opposite ends of the pocket, the mounting brackets being offset in lateral direction from the longitudinal direction of the pocket.

The mounting means may be arranged for supporting the pocket in an vertical orientation or in a horizontal orientation in a truck box of a truck, but an upright orientation is preferred so that a locking pin is not always required to hold the stem of the ball mount within the pocket.

DESCRIPTION OF THE DRAWINGS

Various embodiments of the invention will now be described in conjunction with the accompanying drawings in which:

FIG. 3 is an end elevational view of the holder of FIG. 1.

FIG. 4 is an isometric view of the holder of FIG. 1 in a mounted position on a truck box.

In the drawings like characters of reference indicate corresponding parts in the different figures.

DETAILED DESCRIPTION

Figure 1:
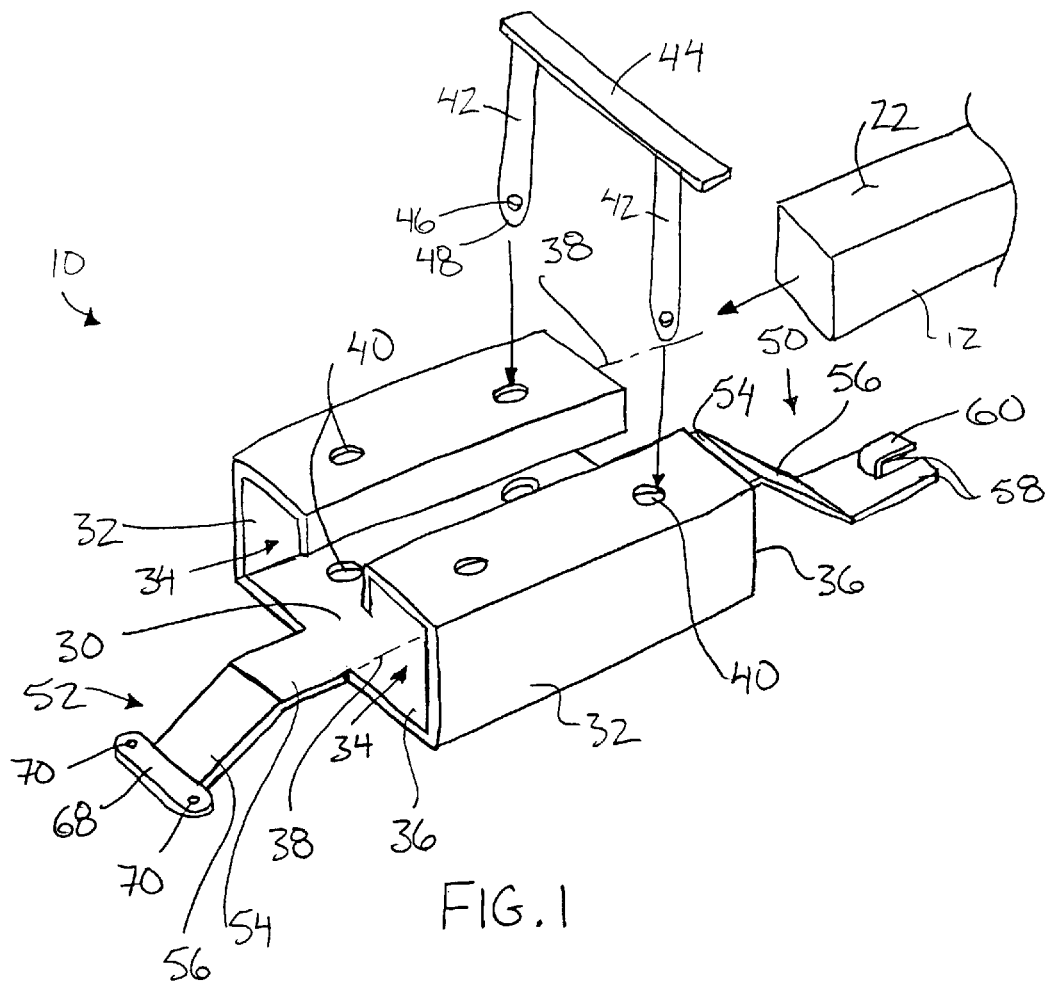
FIG. 1 is a perspective view of the holder.
Figure 2:
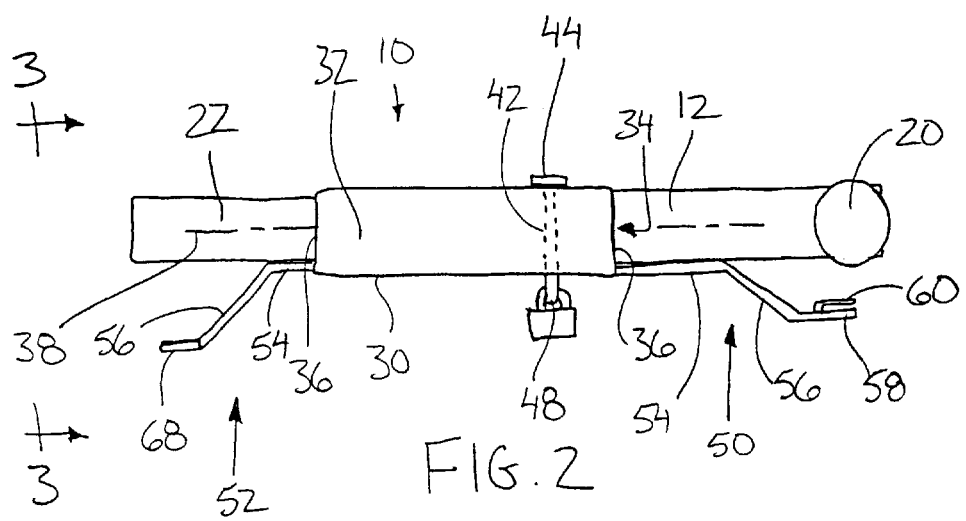
FIG. 2 is a side elevational view of the holder of FIG. 1.

Referring to the accompanying drawings there is illustrated a ball mount holder generally indicated by reference numeral 10. The holder 10 is generally intended for supporting a ball mount 12 of a ball hitch 14 therein when not in use, or for supporting auxiliary ball mounts having different size balls therein.

The ball hitch 14 generally includes a receiver 16 in the form of a socket which is bolted or welded into place on a frame of a vehicle 18. The ball mount 14 includes the ball 20 of the ball hitch which is mounted on a flat bar welded on the bottom side of a stem 22 of the ball mount. The stem 22 is typically of standard size being 2 inches by 2 inches square in cross section so as to be received within common sizes of receivers 16 in a slidable manner, in which the receiver similarly has an interior dimension that is 2 inches by 2 inches square in cross section. A locking pin 24 is provided which is arranged to be slidably received through respective transverse locking apertures 26 in both the stem of the ball mount and the receiver 16 for alignment when the stem is received within the receiver. The locking pin 24 ensures that the ball mount is restricted from further relative sliding to the receiver in a mounted in use position.

The holder 10 is formed of a ⅛ inch thick metallic plate which is suitably cut and folded into a desired shape. The holder includes a main portion 30 which is flat and rectangular so as to act as a main frame of the holder. A pair of side portions 32 extend from opposing sides of the main portion 30 so as to be folded into respective square tubes defining two elongate pockets 34 forming openings extending in respective longitudinal directions between open ends 36 thereof. Each pocket 34 has interior dimensions which are approximately 2 inches by 2 inches square in cross section for receiving the stem 22 of the ball mount slidably therein. The pockets each include a respective longitudinal axis 38 extending in the longitudinal direction thereof between respective open ends 36, which are oriented parallel and spaced apart from one another so that the spaced pockets 34 are joined by the main portion 30 of the holder which forms part of the mounting bracket for supporting the pockets on a supporting surface of a vehicle.

Each pocket includes a pair of locking apertures 40 at spaced positions therein which extend through two opposing sides in each pocket in a direction transverse to the openings of the pocket extending in the longitudinal direction. Within each pocket the pair of apertures 40 in opposing sides thereof are aligned with one another for receiving a locking member 42 slidably therethrough perpendicularly to the longitudinal direction so that when a stem 22 of a ball mount is inserted into the pocket, the locking member 42 may be received within the transverse aperture 26 in the ball mount for selectively restricting sliding removal of the ball mount from the pocket of the holder 10. The locking members 42 of the two pockets are joined by a plate 44 which is mounted perpendicularly to the locking members at one end thereof with the locking members being spaced apart on the plate 44 for alignment with respective spaced pockets 34. One or both of the locking members 42, when they are joined together, includes a suitable locking aperture 46 in a free end 48 thereof. The locking aperture in the free ends of the locking member 42 permit a suitable padlock to be received therein to selectively restrict sliding removal of the locking member 42 which in turn selectively restricts sliding removal of the ball mounts from the holder.

A mounting bracket is provided at each of the opposed ends 36 of the pockets. The brackets include a top mounting bracket 50 and a bottom mounting bracket 52. Both mounting brackets 50 and 52 include a first plate 54 which extends in the longitudinal direction of the pockets outward from opposed ends of the main portion 30 of the holder from a position between the pockets 34. A second plate 56 projections outwardly from the first plate 54 of each mounting bracket at an incline away from the plane containing the longitudinal axis of both pockets while extending outward in the longitudinal direction. The free ends of the second plates 56 are thus arranged to be offset in a lateral direction from the longitudinal direction of the pockets in a same lateral direction as one another.

The top mounting bracket 50 includes two fingers 58 which lie in a common plane parallel to the longitudinal direction of the pockets. The fingers 58 are spaced apart sufficiently to receive a tongue 60 therebetween which lies parallel to the fingers while being spaced outwardly in a lateral direction from the plane containing the fingers so as to be sufficiently offset therefrom to define a slot to slidably receive a cap flange 62 of a truck box therebetween in a mounted position. The holder is thus suitably arranged for mounting within a truck box 64 of the type having side walls extending upwardly to a respective cap 66 which includes a cap flange 62 projecting downwardly from an inner side of the cap spaced upwardly from the floor of the truck box. The holder is mounted within the truck box by inserting the top mounting bracket 50 upward into engagement with the cap flange 62 so that the cap flange is received between the tongue 60 and the two fingers 58 while the pockets are offset laterally inwardly relative to the cap and side walls of the truck box.

The bottom mounting bracket 52 of the holder includes a plate 68 having suitable apertures therein for receiving respective fasteners therethrough. The plate 68 lies parallel to a plane containing both pockets 34 therein for mounting against the side wall of the truck box along an inner surface thereof, while the pockets remain parallel and spaced outwardly from the side wall of the truck box. The apertures 70 in the plate 68 are spaced apart from one another a spacing equal to existing mounting holes 72 in current model Ford pick-up trucks which normally mount a tie mount in the truck box along an inner side wall of the truck box adjacent the rear tailgate thereof. The plate 68 is laterally offset and spaced outward from the plane containing the pockets 34 and containing the longitudinal axis of the respective pockets so as to ensure that the pockets are suitably spaced out from the inner side walls of the truck box to provide clearance for a ball mount received therein which extends upwardly beyond a cap of the truck box. The apertures 70 within the plate 68 are also spaced from the top mounting bracket 50 in the longitudinal direction of the pockets, a spacing equal to the vertical spacing between the cap flange 62 and the existing mounting holes 72 in current model Ford pick-up trucks.

Figure 5:
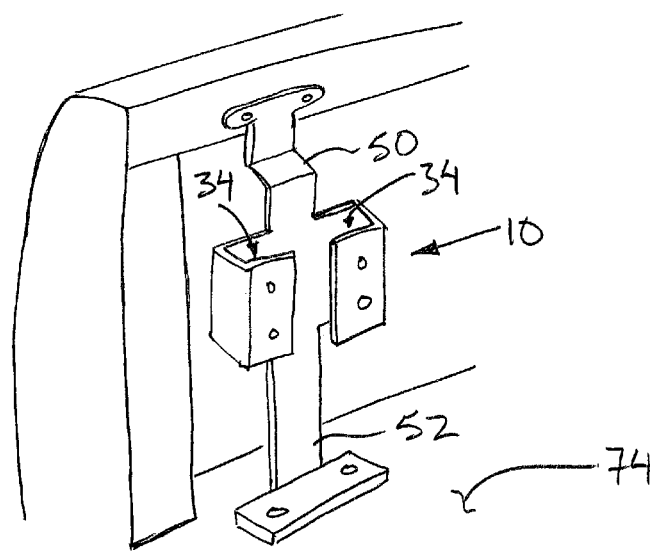
FIGS. 5 and 6 are isometric views of respective alternative embodiments of the holder.

In use, the holder can be mounted on any type of vehicle by providing suitable mounting apertures in both the top and bottom mounting brackets. In a preferred embodiment when mounting in a truck box, the top mounting bracket preferably comprises the tongue and finger configuration described above for insertion of the cap flange 62 of a truck box therebetween. The bottom mounting bracket 52 may then comprise any arrangement of mounting plate with suitable apertures for receiving fasteners therethrough which is either oriented parallel to the longitudinal direction of the pockets offset in the same direction as the top mounting bracket from the plane of the pockets, or a plate which is oriented perpendicular to the longitudinal direction of the pockets for the intention of bolting to the floor of the truck box as shown in FIG. 5. When the plate is oriented perpendicular to the longitudinal direction of the pockets, the plate is preferably spaced from the top mounting bracket a spacing which is substantially equal to the spacing between the cap flange 62 and the floor 74 of a conventional truck box. In either embodiment installation first includes inserting the top mounting bracket over top of the cap flange at which point the bottom mounting bracket 52 can be bolted in place either to the inner side wall of the truck box or the floor thereof by drilling mounting holes if required. In either arrangement the pockets are oriented in a vertical configuration spaced inwardly from the top mounting bracket and the cap flange 62 to which it is mounted. Ball mounts may thus be stored therein by slidably receiving the stem portion into the respective pocket of the holder 10. The holder may be used only for holding the ball mounts to prevent them sliding around in the truck box or the trunk of the vehicle, or the additional use of the locking member 42 may be employed for use of the holder 10 as an anti-theft device for ball mounts.

Figure 6:
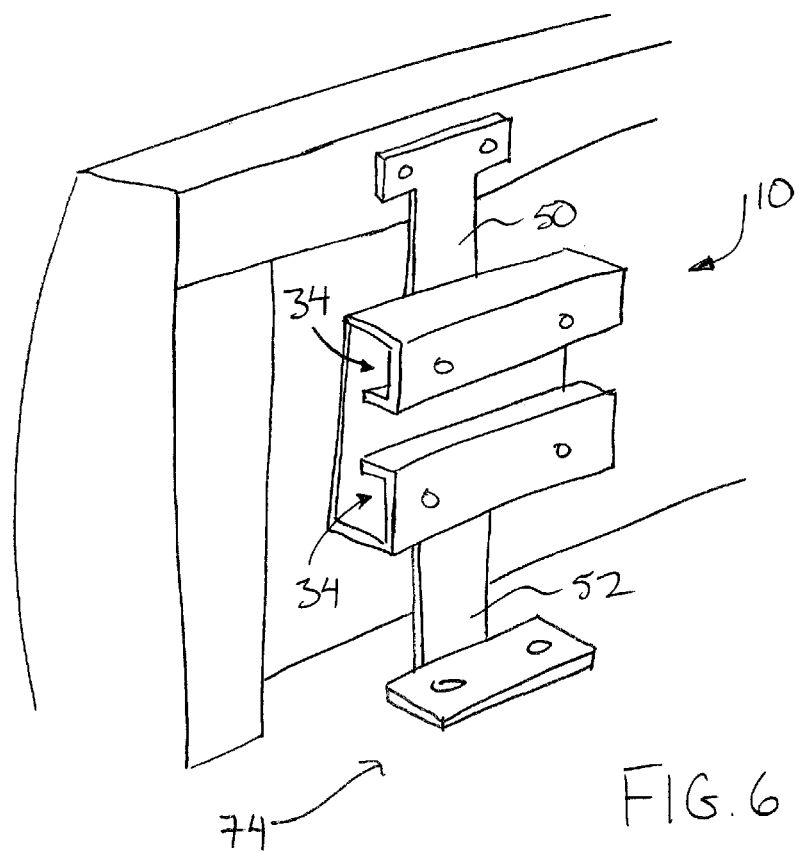

In further embodiments, the pockets may be oriented in a horizontal configuration with the mounting brackets extending outwardly from opposing sides transversely to the longitudinal direction of the pockets as illustrated in FIG. 6. Also, the top mounting bracket may comprise a mounting plate having apertures therein for bolting to the cap flange by drilling suitable holes in the cap flange as required. When both the top and bottom mounting brackets comprises plates with bolt holes therein, the pocket can be mounted at any location along the side walls or floor of the truck box by drilling suitable holes to receive fasteners as desired.

Since various modifications can be made to the invention as herein above described, and many apparently widely different embodiments of same made within the spirit and scope of the claims without departing from such spirit and scope, it is intended that all matter contained in the accompanying specification shall be interpreted as illustrative only and not in a limiting sense.

What is claimed is:

1. A holder for a ball mount having a stem and a ball supported on the stem in a ball hitch in which the stem is slidably received within a receiver supported on a vehicle, the holder comprising:

a pocket for receiving the stem, the pocket being generally tubular and extending in a longitudinal direction between opposing ends; and mounting means for mounting the pocket on the vehicle, the mounting means comprising a mounting bracket extending in the longitudinal direction of the pocket from each end of the pocket beyond the respective end of the pocket to a respective free end of the mounting bracket;

the free ends of the mounting brackets being offset from the longitudinal direction of the pocket in a common lateral direction and being configured for securement to a supporting surface wherein at least one of the free ends lies parallel to the longitudinal direction of the pocket.

2. The holder according to claim 1 wherein the pocket includes an opening extending therethrough which has interior dimension of approximately 2 inches by 2 inches in cross section.

3. The holder according to claim 1 wherein there is provided a plurality of pockets having respective longitudinal axes oriented parallel to one another at spaced positions from one another by the mounting means.

4. The holder according to claim 1 wherein the pocket includes an opening extending therethrough and transverse locking apertures in opposed sides thereof for receiving a locking member transversely across the opening of the pocket.

5. The holder according to claim 1 wherein the pocket and the mounting means are integrally formed of a single plate of material which has been cut and folded.

6. The holder according to claim 1 wherein the mounting means are arranged for supporting the pocket in an upright orientation in a truck box of a truck.

7. The holder according to claim 1 wherein at least one of the mounting brackets comprises a plate member having mounting apertures therein for receiving respective fasteners therethrough.

8. The holder according to claim 7 wherein one of the mounting brackets comprises a slot for slidably receiving a flange therein opposite the mounting apertures.

9. The holder according to claim 8, wherein the slot and the mounting apertures are spaced apart and at opposite ends of the pocket.

10. A method of storing a ball mount having a stem and a ball supported on the stem in a ball hitch in which the stem is slidably received within a receiver supported on a truck having a truck box, the method comprising:

providing a pocket for slidably receiving the stem, the pocket extending in a longitudinal direction between opposing ends and having mounting brackets extending in the longitudinal direction from respective ones of the opposing ends of the pocket;

mounting an upper one of the mounting brackets of the pocket on a cap flange of the truck box;

mounting a lower one of the mounting brackets of the pocket on the truck box below the cap flange such that the pocket is oriented in a generally upright configuration; and sliding the stem into the pocket.

11. The method according to claim 10 wherein the upper one of the brackets has a slot therein and wherein the method includes mounting the pocket in the box of the truck by inserting the cap flange of the box into the slot in the upper one of the mounting brackets.

12. The method according to claim 10 including forming the pocket and mounting means for the pocket of a single sheet of material which is cut and folded.

13. The method according to claim 10 including mounting the pocket spaced outwardly from a supporting surface of the vehicle upon which the pocket is mounted.

14. The method according to claim 10 including locking the stem within the pocket using suitable locking means.

15. A method of storing a ball mount having a stem and a ball supported on the stem in a ball hitch in which the stem is slidably received within a receiver supported on a truck having a truck box, the method comprising:

providing a pocket for slidably receiving the stem;

mounting the pocket on the truck box spaced from an inner side wall of the box upon which the pocket is supported; and sliding the stem into the pocket.

16. A method of storing a ball mount having a stem and a ball supported on the stem in a ball hitch in which the stem is slidably received within a receiver supported on a truck having a truck box, the method comprising:

providing a pocket for slidably receiving the stem;

mounting the pocket to an inner side wall of the box using fasteners and existing mounting apertures in the inner side wall of the and sliding the stem into the pocket.

17. A holder for a ball mount having a stem and a ball supported on the stem in a ball hitch in which the stem is slidably received within a receiver supported on a vehicle, the holder comprising:

a pocket for receiving the stem, the pocket being generally tubular and extending in a longitudinal direction between opposing ends; and mounting means on the opposing ends of the pocket for mounting the pocket on the vehicle;

wherein the pocket is formed of a single plate of material which has been cut and folded and the mounting means are formed integrally with the pocket from said single plate of material.

\* \* \* \* \*